(12) United States Patent
Cheon et al.

(10) Patent No.: US 9,735,829 B2
(45) Date of Patent: Aug. 15, 2017

(54) ELECTRONIC DEVICE INCLUDING MULTI-FEED, MULTI-BAND ANTENNA USING EXTERNAL CONDUCTOR

(71) Applicant: SAMSUNG ELECTRO-MECHANICS CO., LTD., Suwon-si (KR)

(72) Inventors: Young Min Cheon, Suwon-si (KR); Dae Seong Jeon, Suwon-si (KR); Jun Seung Yi, Suwon-si (KR); Nam Ki Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/050,980

(22) Filed: Feb. 23, 2016

(65) Prior Publication Data
US 2016/0277062 A1  Sep. 22, 2016

(30) Foreign Application Priority Data

Mar. 18, 2015 (KR) .......................... 10-2015-0037322
Dec. 28, 2015 (KR) .......................... 10-2015-0187603

(51) Int. Cl.
*H04B 1/44* (2006.01)
*H04B 1/525* (2015.01)
(Continued)

(52) U.S. Cl.
CPC ........... *H04B 1/525* (2013.01); *H04B 1/3827* (2013.01); *H04B 1/48* (2013.01); *H04B 2001/485* (2013.01)

(58) Field of Classification Search
CPC .......... H01Q 1/243; H01Q 9/42; H01Q 13/10; H01Q 9/0421; H01Q 21/28; H01Q 1/48;
(Continued)

(56) References Cited

U.S. PATENT DOCUMENTS

2006/0197712 A1* 9/2006 Niemi .................... H01Q 1/243
343/873
2012/0231750 A1 9/2012 Jin et al.
(Continued)

FOREIGN PATENT DOCUMENTS

KR 10-2012-0102517 A 9/2012
KR 10-2013-0115319 A 10/2013
(Continued)

*Primary Examiner* — Golam Sorowar
(74) *Attorney, Agent, or Firm* — NSIP Law

(57) ABSTRACT

An electronic device includes a board embedded in the electronic device, having a peripheral portion and a conductive region including a ground and a non-conductive region, an external conductor located in the peripheral portion and including a first non-segmented conductor having persistence with respect to performing an antenna function and connected to the ground. The device also includes a first antenna pattern configured to receive a first feed signal that contribute to first resonance for a first communications band, a second antenna pattern configured to receive a second feed signal that contributes to second resonance for a second communications band, and a first shield located between the first antenna pattern and the second antenna pattern that is connected to each of the ground and the first non-segmented conductor.

16 Claims, 14 Drawing Sheets

(51) Int. Cl.
*H04B 1/48* (2006.01)
*H04B 1/3827* (2015.01)
(58) Field of Classification Search
CPC .......... H01Q 21/30; H01Q 5/371; H01Q 1/38;
H01Q 5/307; H01Q 5/35; H01Q 5/364;
H01Q 7/00; H04B 1/38; H04B 1/3888
See application file for complete search history.

(56) References Cited

U.S. PATENT DOCUMENTS

| | | | |
|---|---|---|---|
| 2012/0293375 A1* | 11/2012 | Chirila | H01Q 1/243 343/702 |
| 2014/0184453 A1* | 7/2014 | Chen | H01Q 1/243 343/725 |
| 2014/0292590 A1 | 10/2014 | Yoo et al. | |
| 2015/0207211 A1* | 7/2015 | Martiskainen | H01Q 21/30 343/702 |
| 2015/0340756 A1* | 11/2015 | Huang | H01Q 13/10 343/702 |

FOREIGN PATENT DOCUMENTS

KR  10-2014-0119928 A  10/2014
WO  WO 2012/096891 A2  7/2012

\* cited by examiner

ELECTRONIC DEVICE INCLUDING MULTI-FEED, MULTI-BAND ANTENNA USING EXTERNAL CONDUCTOR

CROSS-REFERENCE TO RELATED APPLICATION(S)

This application claims the benefit under 35 USC 119(a) of Korean Patent Application Nos. 10-2015-0037322 filed on Mar. 18, 2015 and 10-2015-0187603 filed on Dec. 28, 2015 in the Korean Intellectual Property Office, the entire disclosures of which are incorporated herein by reference for all purposes.

BACKGROUND

1. Field

The following description relates to an electronic device including a multi-feed, multi-band antenna using an external conductor.

2. Description of Related Art

Recently, the popularity of metal designs for electronic devices, such as smartphones and the like, has gradually increased. Interest in such metal designs has increased due to the improved appearance and internal stiffness of electronic devices offered by using such metal designs.

An external conductor may be used with the aim of improving the appearance of electronic devices, and a conductor frame may be embedded in the external conductor for the purpose of increasing the internal rigidity of the electronic device.

As an example, research into technology in which external conductors are used as portions of antennas and the development of such technology have been conducted by some electronic device manufacturers to use a metal design.

In an electronic device having an existing antenna using an external conductor, in order to use the external conductor as a portion of the antenna, a gap may be formed by removing a portion of the external conductor exposed to the exterior, and then an end portion of the external conductor segmented by the gap is used as the antenna.

However, in electronic devices according to such an approach, appearances of the electronic devices may be defective due to the segmentation of the external conductor, and a manufacturing yield may be low in a metal-working process.

In addition, in recent approaches, as external conductors are used in smartphones, external conductors have been segmented in order to secure effective radiation performance of the antennas thereof. As an example, the external conductor has been manufactured in four segmented structures. However, it may be difficult to manufacture the four segmented structures of the external conductor, and manufacturing yield may still be poor.

Therefore, manufacturers have made efforts to remove segmented metal structures or to reduce the size of segmented metal structures to cause them to be as small as possible. However, because it is advantageous to increase the number of segmented structures in order to secure performance of the antenna, segmented points are still included in the external conductor in many approaches.

In summary, in an approach in which the entire external conductor is used as the antenna, it is difficult to implement the set target value of the antenna, so that the antenna functions properly. Therefore, it is generally required to segment at least a portion of the external conductor. However, in a case in which multiple segmented points are present in the external conductor, a yield is accordingly reduced in a metal working process used to manufacture the external conductor.

Thus, it is advantageous in terms of the performance of the antenna for the external conductor to include the segmented points. However, demand for technology for securing the performance of antennas while simultaneously utilizing an external conductor including segmented points that are as small as possible in order to maximize manufacturing yield and attractive appearance has gradually increased.

Existing alternative approaches do not disclose a way to effectively achieve the technical goals as described above.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes a board, including a peripheral portion, a conductive region including a ground, and a non-conductive region, an external conductor located in the peripheral portion and including a first non-segmented conductor connected to the ground and having persistence to perform as an antenna, a first antenna pattern configured to receive a first feed signal and connected to the first non-segmented conductor to contribute to a first resonance of a first communications band, a second antenna pattern configured to receive a second feed signal and connected to the first non-segmented conductor to contribute to a second resonance of a second communications band, and a first shield located between the first antenna pattern and the second antenna pattern to shield signal interference therebetween and connected to each of the ground and the first non-segmented conductor.

The first shield may provide paths for the first and second feed signals from the first non-segmented conductor to the ground.

The electronic device may further include a circuit part configured to provide the first and second feed signals, wherein the circuit part includes a first communications circuit configured to provide the first feed signal to the first antenna pattern, and a second communications circuit configured to provide the second feed signal to the second antenna pattern.

The electronic device may further include a first impedance adjusting circuit located in at least one of a region between the first antenna pattern and the first non-segmented conductor and a region between the first antenna pattern and the ground, wherein the first impedance adjusting circuit adjusts impedance in order to change a resonance frequency within the first communications band associated with the first antenna pattern.

The first impedance adjusting circuit may include a fixing coupling element and a switch impedance circuit connected in parallel to the fixing coupling element.

The switch impedance circuit may include at least one of a switch connected to a capacitor and a switch connected to an inductor.

The electronic device may further include a second impedance adjusting circuit located in at least one of a region between the first shield and the first non-segmented conductor and a region between the first shield and the ground, wherein the second impedance adjusting circuit adjusts impedance in order to change a resonance frequency within the first communications band associated with the first antenna pattern.

The first antenna pattern may be disposed in at least one of the non-conductor region of the board and an internal surface of a cover of the electronic device.

The second antenna pattern may be disposed in at least one of the non-conductor region of the board and an internal surface of a cover of the electronic device.

In another general aspect, an electronic device includes a board, including a peripheral portion, a conductive region comprising a ground, and a non-conductive region, an external conductor located in the peripheral portion and including a first non-segmented conductor connected to the ground and having persistence to perform as an antenna, a first antenna pattern configured to receive a first feed signal and connected to the first non-segmented conductor to contribute to a first resonance of a first communications band, a second antenna pattern configured to receive a second feed signal and connected to the first non-segmented conductor to contribute to a second resonance of a second communications band, a third antenna pattern configured to receive a third feed signal and connected to the first non-segmented conductor to contribute to a third resonance of a third communications band, a first shield located between the first antenna pattern and the second antenna pattern to shield signal interference therebetween and connected to the ground and the first non-segmented conductor, and a second shield located between the first antenna pattern and the third antenna pattern to shield signal interference therebetween and connected to each of the ground and the first non-segmented conductor.

The first shield may provide paths for the first and second feed signals from the first non-segmented conductor to the ground, and the second shield may provide paths for the first and third feed signals from the first non-segmented conductor to the ground.

The electronic device may further include a circuit part configured to provide the first to third feed signals, wherein the circuit part includes a first communications circuit configured to provide the first feed signal to the first antenna pattern, a second communications circuit configured to provide the second feed signal to the second antenna pattern, and a third communications circuit configured to provide the third feed signal to the third antenna pattern.

The electronic device may further include a first impedance adjusting circuit located in at least one of a region between the first antenna pattern and the first non-segmented conductor and a region between the first antenna pattern and the ground, wherein the first impedance adjusting circuit adjusts impedance to change a resonance frequency within the first communications band associated with the first antenna pattern.

The electronic device may further include a second impedance adjusting circuit located in at least one of a region between at least one of the first and second shields and the first non-segmented conductor and a region between at least one of the first and second shields and the ground, wherein the second impedance adjusting circuit includes a first impedance adjusting part located in at least one of a region between the first shield and the first non-segmented conductor and a region between the first shield and the ground, and a second impedance adjusting part located in at least one of a region between the second shield and the first non-segmented conductor and a region between the second shield and the ground, and the second impedance adjusting circuit adjusts impedance in order to change a resonance frequency within the first communications band associated with the first antenna pattern.

The first antenna pattern may be located in at least one of the non-conductor region of the board and an internal surface of a cover of the electronic device.

The second antenna pattern may be located in at least one of the non-conductor region of the board and an internal surface of a cover of the electronic device.

The third antenna pattern may be located in at least one of the non-conductor region of the board and an internal surface of a cover of the electronic device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
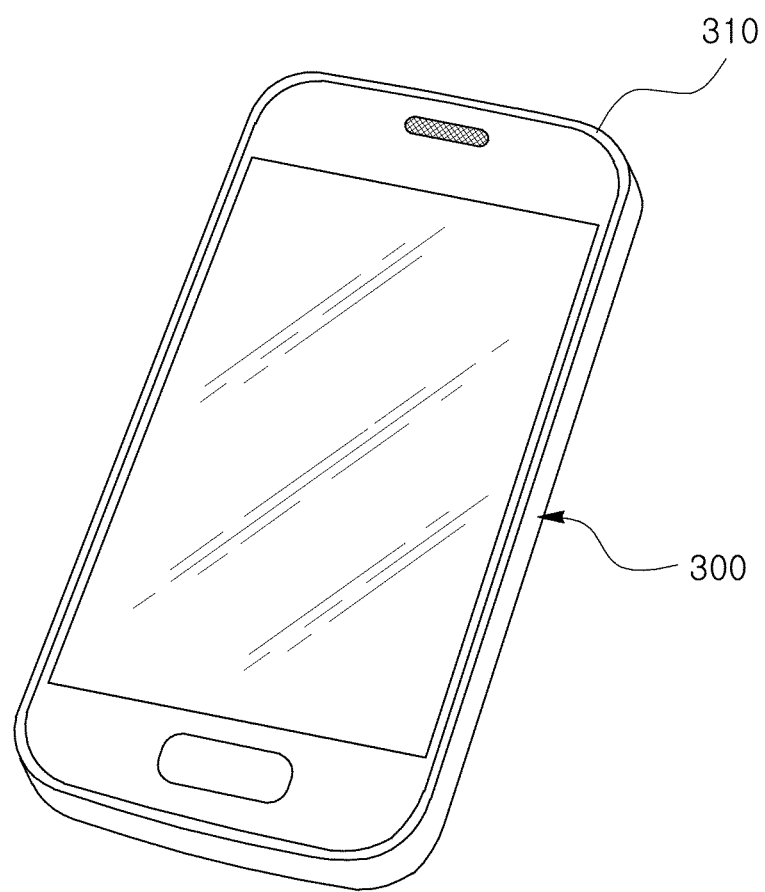
FIG. 1 is a perspective view illustrating an appearance of an electronic device including a multi-feed, multi-band antenna according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, embodiments are described as follows with reference to the attached drawings.

Throughout the specification, it is to be understood that when an element, such as a layer, region, wafer, or substrate, is referred to as being "on," "connected to," or "coupled to" another element, it is possibly directly "on," "connected to," or "coupled to" the other element or other elements intervening therebetween are also possibly present. In contrast, when an element is referred to as being "directly on," "directly connected to," or "directly coupled to" another element, there are no elements or layers intervening between the elements.

Like numerals refer to like elements throughout. As used herein, the term "and/or" includes any and all combinations of one or more of the associated listed items.

It is noted that though the terms first, second, third, etc. are used herein to describe various members, components, regions, layers and/or sections, these members, components, regions, layers and/or sections are not to be limited by these terms. These terms are only used to distinguish one member, component, region, layer or section from another region, layer or section. Thus, a first member, component, region, layer or section discussed below could also be termed a second member, component, region, layer or section without departing from the teachings of the embodiments.

Spatially relative terms, such as "above," "upper," "below," and "lower" and the like, are optionally used herein for ease of description to describe one element's relationship to another element or elements as shown in the figures. It is to be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features accordingly. Thus, the term "above" encompasses both the above and below orientations depending on a particular direction of the figures. The device is also possibly otherwise oriented, such as being rotated 90 degrees or at other orientations, and the spatially relative descriptors used herein are to be interpreted accordingly.

The terminology used herein is for describing particular embodiments only and is not intended to be limiting. As used herein, the singular forms "a," "an," and "the" are intended to include the plural forms as well, unless the context clearly indicates otherwise. It is to be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments are described with reference to schematic views illustrating illustrative embodiments. In the drawings, for example, due to manufacturing techniques and/or tolerances, modifications of the shape shown are possibly estimated. Thus, embodiments are not to be construed as being limited to the particular shapes of regions shown herein, for example, but are to be construed include a change and/or variation occurring in shape results in manufacturing. The following embodiments are also potentially to be considered individually or in a combination thereof.

The contents of the examples described below possibly have a variety of configurations and propose only a required configuration herein, but are not limited thereto.

In accordance with an embodiment, an electronic device is described that includes a multi-feed, multi-band antenna, in which performance of the antenna is improved using a non-segmented conductor member having persistence in order to perform an antenna function in an external conductor, where signal interference between at least two antennas is shielded by using a shielding member between antenna patterns. Here, persistence indicates that the electrical characteristics are consistent, and hence, if an element has persistence it is able to be reliably used in an antenna.

FIG. 1 is a perspective view illustrating an appearance of an electronic device including a multi-feed, multi-band antenna according to an embodiment.

Referring to the example of FIG. 1, an electronic device 10 including a multi-feed, multi-band antenna according to an embodiment includes an external conductor 300 disposed at a peripheral portion of the electronic device 10.

Here, the external conductor 300 according to an embodiment is formed integrally with an internal metal frame disposed in the electronic device or is formed independently of the internal metal frame and is assembled into the electronic device.

Thus, in examples, the external conductor 300 is possibly integrated with a body of the electronic device 10 or is alternatively not integrated with the body of the electronic device 10.

Here, segmentation is not to be formed in a portion of the external conductor 300 according to an embodiment that functions as an antenna. Therefore, the segmentation is formed in another portion of the external conductor 300 that does not function as the antenna.

For example, the multi-feed, multi-band antenna included in the electronic device according to an embodiment includes a plurality of antenna patterns that control a plurality of communications bands. Here, in this example, each of the plurality of antenna patterns has one end connected to a circuit part of a board and the other end is connected to the external conductor. In addition, in this example, a shielding member is added in order to prevent signal interference between the plurality of antenna patterns, so that the plurality of antenna patterns are able to perform communications using respective communications bands without generating the signal interference between one another that would otherwise possibly occur, which is to be described further later.

Figure 2:
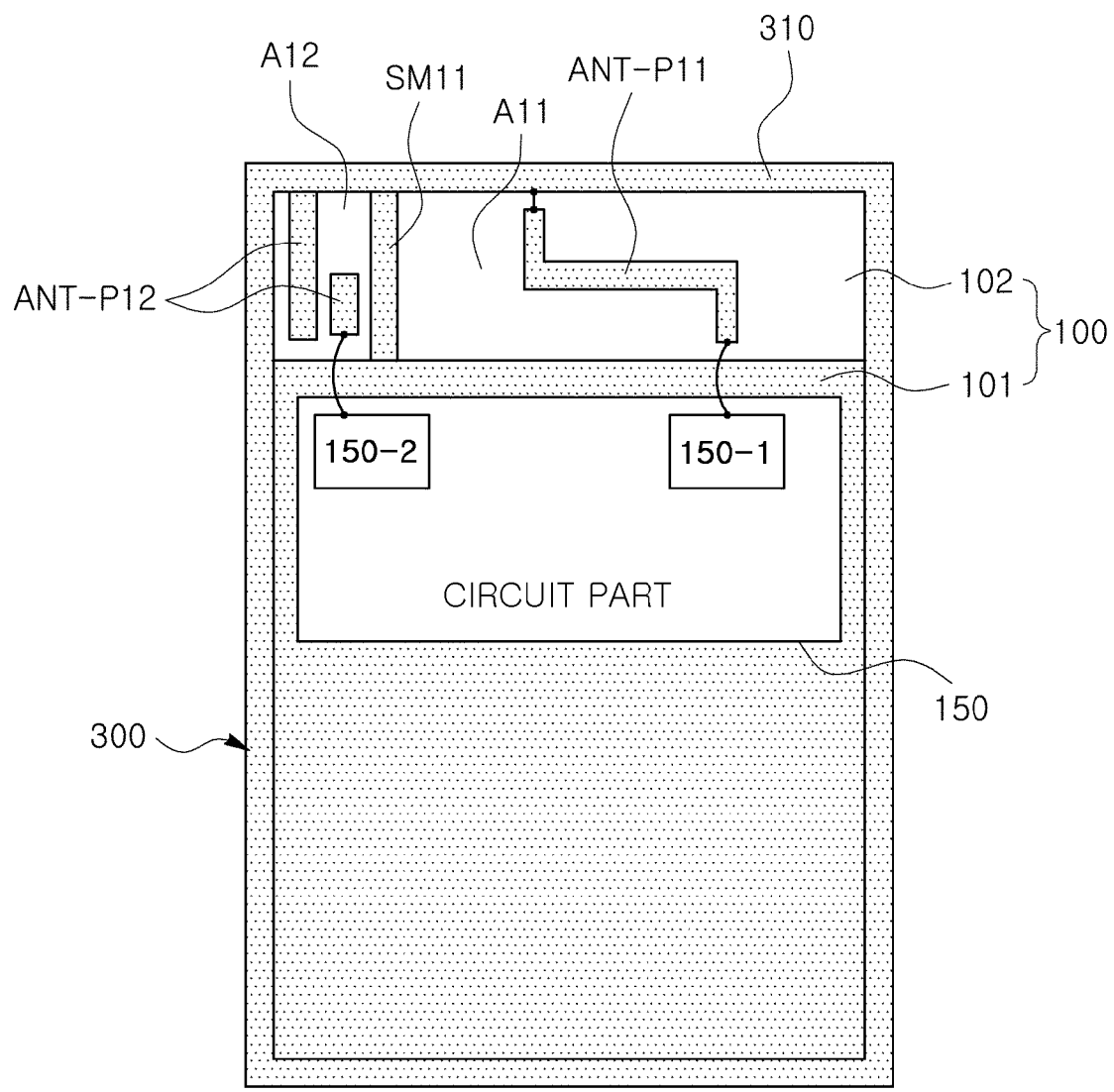
FIG. 2 is a view illustrating a first configuration of an electronic device according to an embodiment.

FIG. 2 is a view illustrating a first configuration of an electronic device according to an embodiment.

Referring to the example of FIG. 2, the electronic device 10 according to an embodiment includes a board 100, an external conductor 300, a first antenna pattern ANT-P11, a second antenna pattern ANT-P12, and a first shielding member or first shield SM11.

For example, the board 100 is embedded in the electronic device 10 having the peripheral portion, and includes a conductive region 101 including a ground and a non-conductive region 102.

In this example, the board 100 further includes a circuit part 150, which includes a first communications circuit 150-1 that provides a first feed signal and a second communications circuit 150-2 that provides a second feed signal.

Here, the first communications circuit 150-1 provides the first feed signal to the first antenna pattern ANT-P11, and the second communications circuit 150-2 provides the second feed signal to the second antenna pattern ANT-P12.

In the example of FIG. 2, the external conductor 300 is disposed in the peripheral portion of the electronic device 10, and includes a first non-segmented conductor member or first non-segmented conductor 310 having persistence in order to perform an antenna function.

For example, the first non-segmented conductor 310 is electrically connected to the ground of the board 100 to contribute to the antenna function, as described further below.

In the example of FIG. 2, the first antenna pattern ANT-P11 receives the first feed signal provided by the first communications circuit 150-1, and is electrically connected to the first non-segmented conductor 310 in order to contribute to first resonance for a first communications band.

In addition, the second antenna pattern ANT-P12 receives the second feed signal provided by the second communications circuit 150-2, and is electrically connected to the first non-segmented conductor 310 in order to contribute to second resonance for a second communications band.

Here, the first shield SM11 is disposed between the first antenna pattern ANT-P11 and the second antenna pattern ANT-P12 to accordingly be electrically connected to each of the ground of the board 100 and the first non-segmented conductor 310.

In the example of FIG. 2, the first shield SM11 shields signal interference between the first antenna pattern ANT-P11 and the second antenna pattern ANT-P12.

In addition, the first shield SM11 provides paths for the first and second feed signals from the first non-segmented conductor 310 to the ground of the board 100.

In this example, the non-conductive region 102 of the board 100 includes first and second non-conductive regions A11 and A12, each corresponding to the first and second antenna patterns ANT-P11 and ANT-P12.

As an example, the first antenna pattern ANT-P11 is disposed so as to correspond to the first non-conductive region A11, and the second antenna pattern ANT-P12 is disposed so as to correspond to the second non-conductive region A12.

Figure 3:
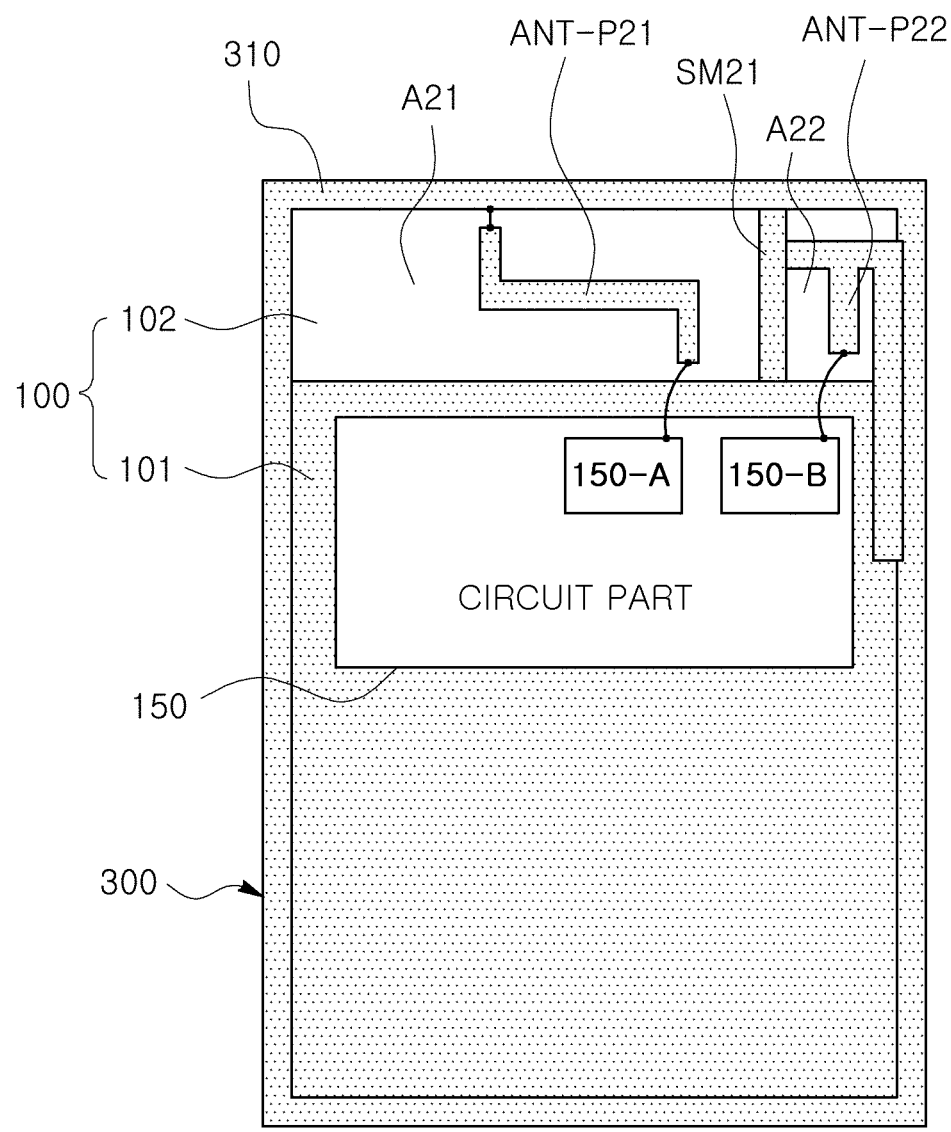
FIG. 3 is a view illustrating a second configuration of an electronic device according to an embodiment.

FIG. 3 is a view illustrating a second configuration of an electronic device according to an embodiment.

Referring to the example of FIG. 3, the electronic device 10 according to an embodiment includes a board 100, an external conductor 300, a first antenna pattern ANT-P21, a second antenna pattern ANT-P22, and a first shield SM21.

In the example of FIG. 3, the board 100 is embedded in the electronic device 10 having the peripheral portion, and includes a conductive region 101 including a ground and a non-conductive region 102.

The board 100 further includes a circuit part 150, which may include a first communications circuit 150-A that provides a first feed signal and a second communications circuit 150-B that provides a second feed signal.

In this example, the first communications circuit 150-A provides the first feed signal to the first antenna pattern ANT-P21, and the second communications circuit 150-B provides the second feed signal to the second antenna pattern ANT-P22.

Here, the external conductor 300 is disposed in the peripheral portion of the electronic device 10, and includes a first non-segmented conductor 310 having persistence in order to perform an antenna function, as described above with reference to the example of FIG. 2.

For example, the first non-segmented conductor 310 is electrically connected to the ground of the board 100 in order to contribute to the antenna function, as described further below.

In this example, the first antenna pattern ANT-P21 receives the first feed signal provided by the first communications circuit 150-A, and is electrically connected to the first non-segmented conductor 310 in order to contribute to a first resonance for a first communications band.

In addition, the second antenna pattern ANT-P22 receives the second feed signal provided by the second communications circuit 150-B, and is electrically connected to the first non-segmented conductor 310 in order to contribute to second resonance for a second communications band.

Here, the first shield SM21 is disposed between the first antenna pattern ANT-P21 and the second antenna pattern ANT-P22 to thereby be electrically connected to each of the ground of the board 100 and the first non-segmented conductor 310.

In this example, the first shield SM21 shields signal interference between the first antenna pattern ANT-P21 and the second antenna pattern ANT-P22.

In addition, the first shield SM21 provides paths for the first and second feed signals from the first non-segmented conductor 310 to the ground of the board 100.

Also, in this example, the non-conductive region 102 of the board 100 includes first and second non-conductive regions A21 and A22, each corresponding to the first and second antenna patterns ANT-P21 and ANT-P22.

As an example, the first antenna pattern ANT-P21 is located so as to correspond to the first non-conductive region A21, and the second antenna pattern ANT-P22 is located so as to correspond to the second non-conductive region A22.

Figure 4:
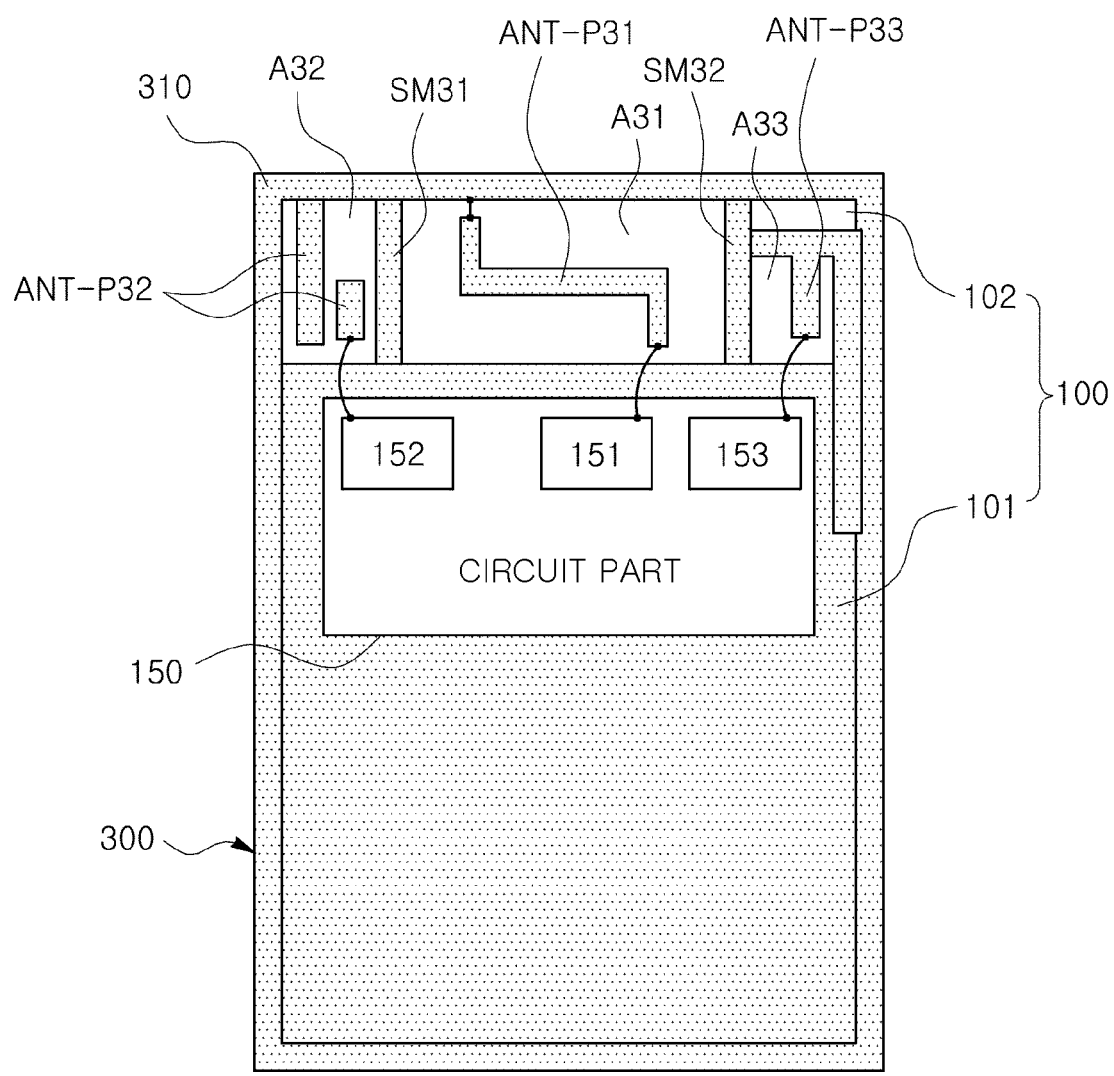
FIG. 4 is a view illustrating a third configuration of an electronic device according to an embodiment.

FIG. 4 is a view illustrating a third configuration of an electronic device according to an embodiment. Also, FIG. 5 is a view illustrating a fourth configuration of an electronic device according to an embodiment.

Figure 5:
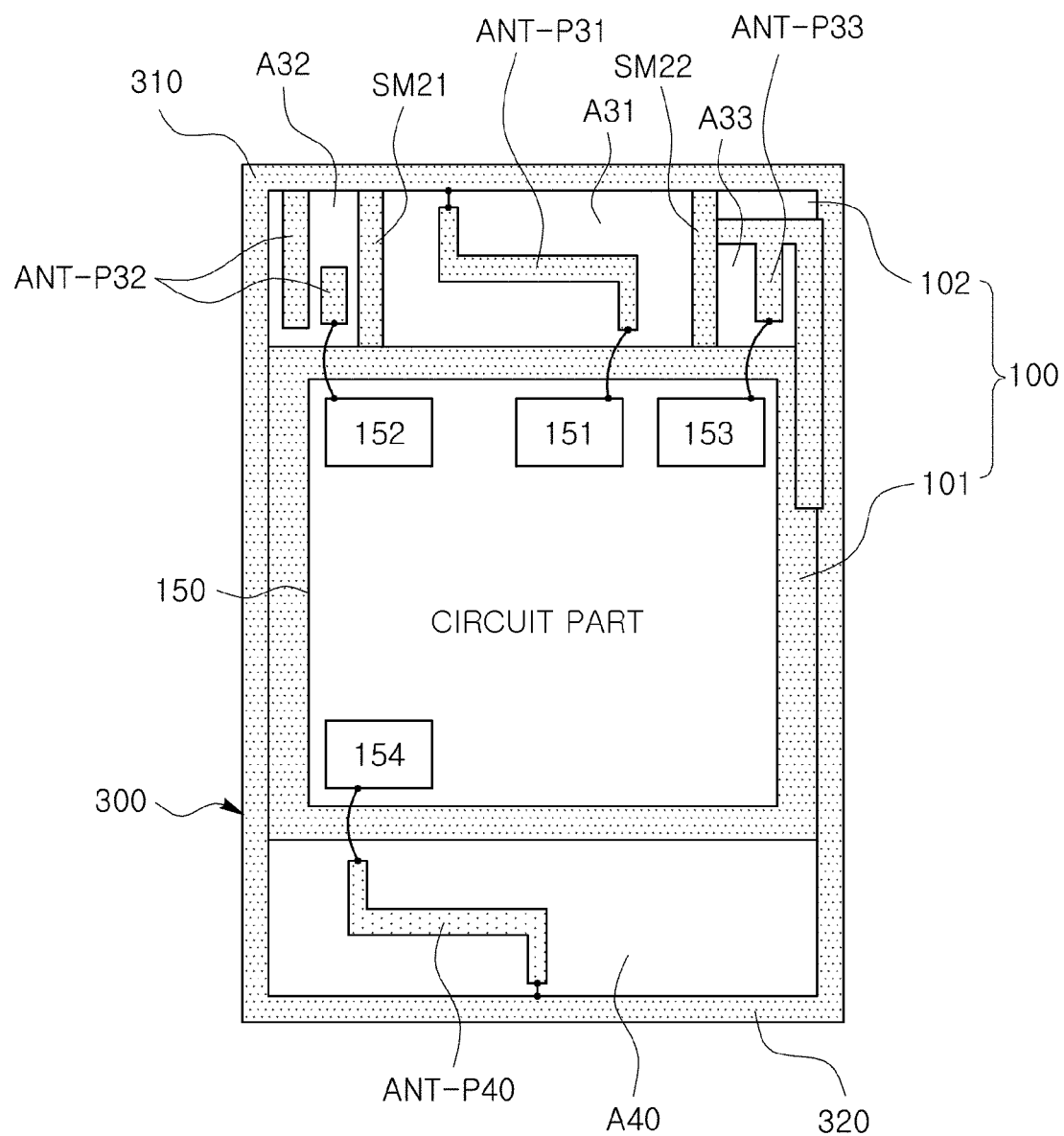
FIG. 5 is a view illustrating a fourth configuration of an electronic device according to an embodiment.

Referring to the examples of FIGS. 4 and 5, the electronic device according to an embodiment includes a board 100, an external conductor 300, a first antenna pattern ANT-P31, a second antenna pattern ANT-P32, a third antenna pattern ANT-33, a first shielding member or first shield SM31, and a second shielding member or second shield SM32.

For example, the board 100 is embedded in the electronic device 10 having the peripheral portion, and includes a conductive region 101 that includes a ground and a non-conductive region 102.

In this example, the board 100 includes a circuit part 150 that provides first to third feed signals.

As an example, the circuit part 150 includes a first communications circuit 151, a second communications circuit 152, and a third communications circuit 153.

The first communications circuit 151 provides the first feed signal to the first antenna pattern ANT-P31, the second communications circuit 152 provides the second feed signal to the second antenna pattern ANT-P32, and the third communications circuit 153 provides the third feed signal to the third antenna pattern ANT-P32.

For example, the external conductor 300 is disposed in the peripheral portion of the electronic device 10, and includes a first non-segmented conductor 310 having persistence in order to perform an antenna function. In this example, the first non-segmented conductor 310 is electrically connected to the ground of the board 100.

In the example of FIG. 3, the first antenna pattern ANT-P31 receives the first feed signal, and is electrically connected to the first non-segmented conductor 310 to contribute to a first resonance for a first communications band.

The second antenna pattern ANT-P32 receives the second feed signal, and is electrically connected to the first non-segmented conductor 310 to contribute to a second resonance for a second communications band.

The third antenna pattern ANT-P33 receives the third feed signal, and is electrically connected to the first non-segmented conductor 310 to contribute to a third resonance for a third communications band.

As an example, the first communications band associated with the first antenna pattern ANT-P31 is a long term evolution (LTE) multi-input multi-output (MIMO) band, for example, 800 to 900 MHz or 1800 to 2100 MHz, the second communications band associated with the second antenna pattern ANT-P32 is a wireless fidelity (Wi-Fi) band, for example, 2.4 GHz, and the third communications band associated with the third antenna pattern ANT-P33 is a global positioning system (GPS) band, for example, 1.575 GHz.

Meanwhile, the first antenna pattern ANT-P31, the second antenna pattern ANT-P32, and the third antenna pattern ANT-P33 are not limited to having a specific shape or form so long as they contribute to appropriate levels of resonance preset for corresponding communications bands, respectively.

As an example, each of the first antenna pattern ANT-P31, the second antenna pattern ANT-P32, and the third antenna pattern ANT-P33 are optionally formed to have a linear shape, a shape having at least one bent part, a polygonal shape, or a round shape.

Referring to the example of FIG. 4, the non-conductive region 102 of the board 100 includes first to third non-conductive regions A31 to A33, each corresponding to the first to third antenna patterns ANT-P31 to ANT-P33.

As an example, the first antenna pattern ANT-P31 is disposed to correspond to the first non-conductive region A31, the second antenna pattern ANT-P32 is disposed to correspond to the second non-conductive region A32, and the third antenna pattern ANT-P33 is disposed to correspond to the third non-conductive region A33.

Referring to the example of FIG. 5, the circuit part 150 includes a fourth communications circuit 154.

The electronic device according to an embodiment may further include a fourth antenna pattern ANT-P40.

The external conductor 300 includes the first non-segmented conductor 310 that performs an antenna function in cooperation with each of the first to third antenna patterns ANT-P31 to ANT-P33.

In addition, the external conductor 300 further includes a second non-segmented conductor member or non-segmented conductor 320 that performs an antenna function in cooperation with the fourth antenna pattern ANT-P40.

Here, in the example of FIG. 4, the fourth antenna pattern ANT-P40 receives a fourth feed signal, and is electrically connected to the second non-segmented conductor 320 so as to contribute to a fourth resonance for a fourth communications band.

Meanwhile, the fourth antenna pattern ANT-P40 is not limited to having a specific shape as long as it is able to contribute to a level of resonance preset for the fourth communications band.

As an example, the fourth antenna pattern ANT-P40 is formed to have a linear shape, a shape having at least one bent part, a polygonal shape, or a round shape.

The fourth communications circuit 154 provides the fourth feed signal to the fourth antenna pattern ANT-P40.

As an example, the fourth communications band associated with the fourth antenna pattern ANT-P40 is an LTE band, for example, 800 to 900 MHz or 1800 to 2100 MHz, that is the same as the first communications band.

Referring to the example of FIG. 5, the non-conductive region 102 of the board 100 includes first to third non-conductive regions A31 to A33, each corresponding to the first to third antenna patterns ANT-P31 to ANT-P33.

As an example, the first antenna pattern ANT-P31 is formed to correspond to the first non-conductive region A31, the second antenna pattern ANT-P32 is formed to correspond to the second non-conductive region A32, and the third antenna pattern ANT-P33 is formed to correspond to the third non-conductive region A33.

In addition, the non-conductor region 102 of the board 100 includes a fourth non-conductive region A40 that corresponds to the fourth antenna pattern ANT-P40.

As an example, the fourth antenna pattern ANT-P40 is formed to correspond to the fourth non-conductive region A40.

The first shield SM31 is disposed between the first antenna pattern ANT-P31 and the second antenna pattern ANT-P32 to accordingly be electrically connected to each of the ground of the board 100 and the first non-segmented conductor 310.

Here, the first shield SM31 shields signal interference that occurs between the first antenna pattern ANT-P31 and the second antenna pattern ANT-P32.

In addition, the first shield SM31 provides paths for the first and second feed signals from the first non-segmented conductor 310 to the ground of the board 100.

The second shield SM32 is located between the first antenna pattern ANT-P31 and the third antenna pattern ANT-P33 to thereby be electrically connected to each of the ground of the board 100 and the first non-segmented conductor 310.

Here, the second shield SM32 shields signal interference that occurs between the first antenna pattern ANT-P31 and the third antenna pattern ANT-P33.

In addition, the second shield SM32 provides paths for the first and third feed signals from the first non-segmented conductor 310 to the ground of the board 100.

As illustrated in the examples of FIGS. 4 and 5, the first to fourth antenna patterns are located on one surface of the non-conductive region 102 of the board 100 or are located on a layer different to that of the board 100.

An example of locating the antenna patents is described further later with reference to FIGS. 8, 9, and 11.

Referring to the examples of FIGS. 4 and 5, in an example in which the first antenna pattern ANT-P31 is used as a main antenna pattern, when the second antenna pattern ANT-P32 and the third antenna pattern ANT-P33 are used as auxiliary antenna patterns, at least one impedance adjusting circuit formed of a single passive element or a combination of passive elements is disposed in a feed line that is formed between the first antenna pattern ANT-P31 and the first communications circuit 151. Such an impedance adjusting circuit is potentially used in order to implement the LTE MIMO, as an example.

Meanwhile, in an example, as described further above, the board 100 of the electronic device includes the conductive region 101 formed of a conductive material and the non-conductive region 102 formed of a non-conductive material. It is to be recognized that a variety of materials are suitable candidates for the conductive region 101 and the non-conductive region 102, assuming that they have appropriate conduction properties.

In this example, the circuit part 150 is disposed in the conductive region 101. The circuit part 150 includes the first communications circuit 151 that provides the first feed signal, the second communications circuit 152 that provides the second feed signal, and the third communications circuit 153 that provides the third feed signal.

Here, the conductive region 101 is connected to a reference potential to maintain a predetermined level of potential during device operation. As an example, the reference potential connected to the conductive region 101 is a ground potential.

In addition, referring to the examples of FIGS. 4 and 5, the first and second non-conductive regions A31 and A32 of the board 100 are divided by the first shield SM31 extended from the conductive region 101 to thereby separate or isolate the first and second non-conductive regions A31 and A32 of the board 100 from each other. Also, in an example, the first and third non-conductive regions A31 and A33 are divided by the second shield SM32 extended from the conductive region 101 to accordingly separate or isolate the first and third non-conductive regions A31 and A33 from each other.

In this example, the first to third non-conductive regions A31 to A33, separated from each other by the first and second shields SM31 and SM32, have a quadrangular shape, as illustrated in FIGS. 4 and 5, but in other examples the first to third non-conductive regions A31 to A33 have various shapes other than the quadrangular shape.

In respective embodiments, descriptions that overlap with the contents described above with reference to FIGS. 4 and 5 among contents that are described later with reference to FIGS. 6A through 13 are omitted for brevity. However, reference numerals referred to in FIGS. 6A through 13 are used to assist in comprehension, and overlapped descriptions related to these reference numerals are also omitted for brevity.

FIGS. 6A through 6D are views illustrating first impedance adjusting circuits according to an embodiment.

Referring to the examples of FIGS. 6A through 6D, the electronic device 10 according to an embodiment further includes a first impedance adjusting circuit IA10 located in at least one of a region between the first antenna pattern ANT-P31, see FIG. 4, and the first non-segmented conductor 310, a region between the first antenna pattern ANT-P31 and the circuit part 150 of the board 100, and a region between the first antenna pattern ANT-P31 and the ground of the board 100.

Figure 6A:
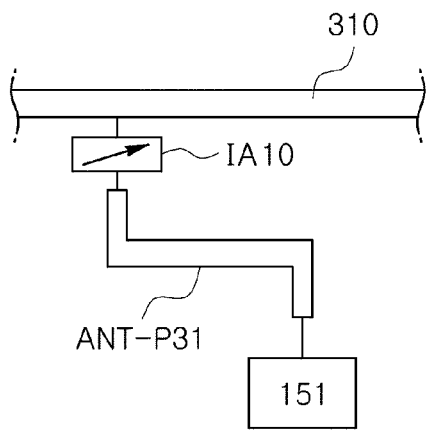
FIGS. 6A through 6D are views illustrating first impedance adjusting circuits according to an embodiment.

As illustrated in the example of FIG. 6A, the first impedance adjusting circuit IA10 is located between the first antenna pattern ANT-P31 and the first non-segmented conductor 310.

Figure 6B:
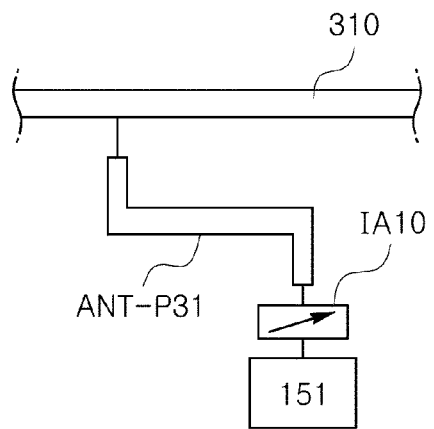

As illustrated in the example of FIG. 6B, the first impedance adjusting circuit IA10 is located between the first antenna pattern ANT-P31 and the circuit part of the board 100.

Figure 6C:
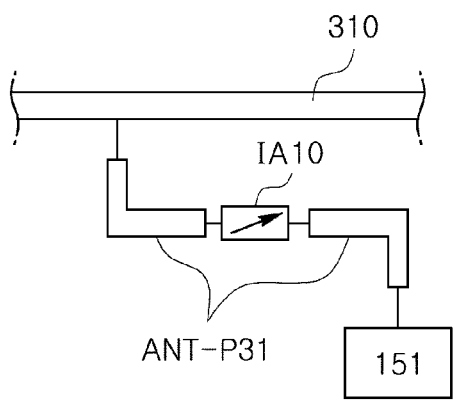

Referring to the example of FIG. 6C, the first impedance adjusting circuit IA10 is located in the middle of the first antenna pattern ANT-P31.

Figure 6D:
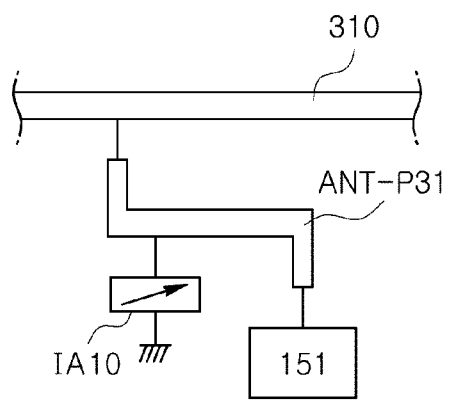

Referring to the example of FIG. 6D, the first impedance adjusting circuit IA10 is disposed between the first antenna pattern ANT-P31 and the ground of the board 100.

The first impedance adjusting circuit IA10 adjusts impedance in order to change a resonance frequency within the first communications band associated with the first antenna pattern ANT-P31, see FIG. 4.

Figure 12:
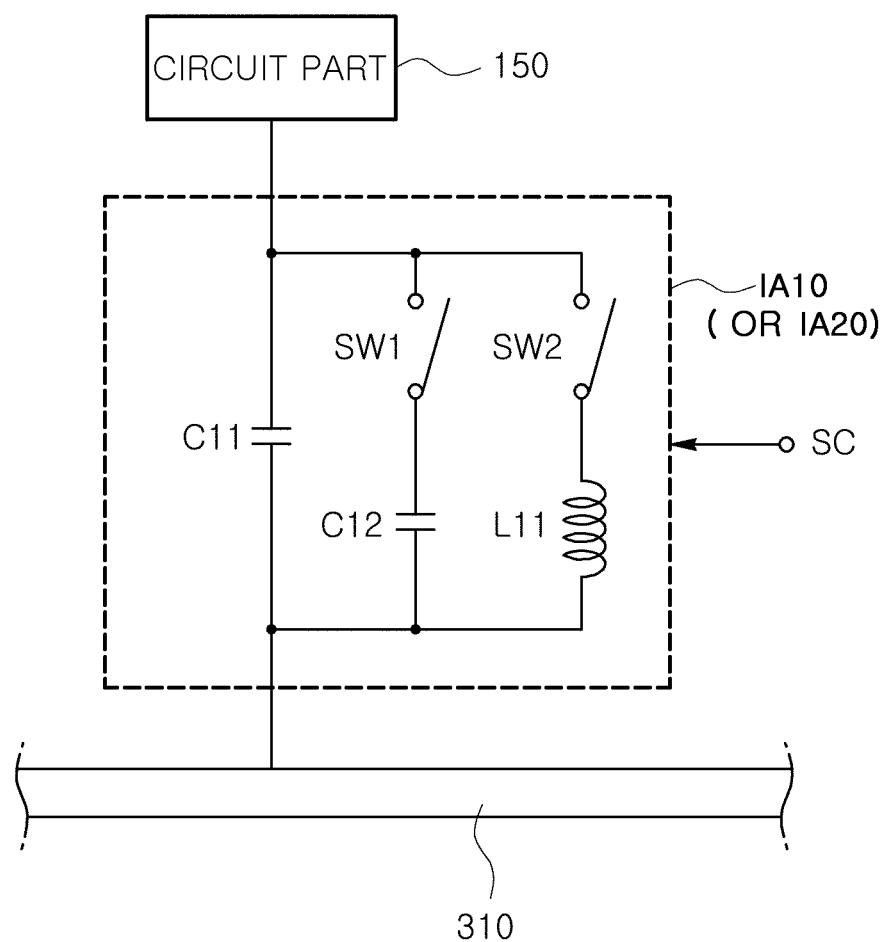
FIG. 12 is a view illustrating a first impedance adjusting circuit according to an embodiment.

As an example, the first impedance adjusting circuit is implemented as illustrated in FIG. 12. In this example, impedance is varied depending on a control signal SC, see FIG. 12, and thus, a resonance frequency is varied.

Figure 7A:
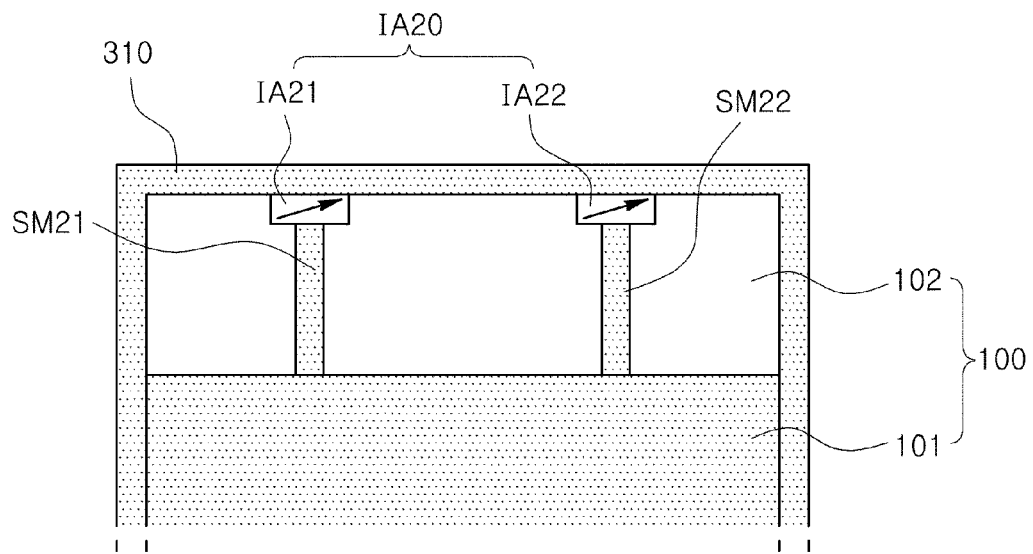
FIGS. 7A and 7B are views illustrating second impedance adjusting circuits according to an embodiment.
Figure 7B:
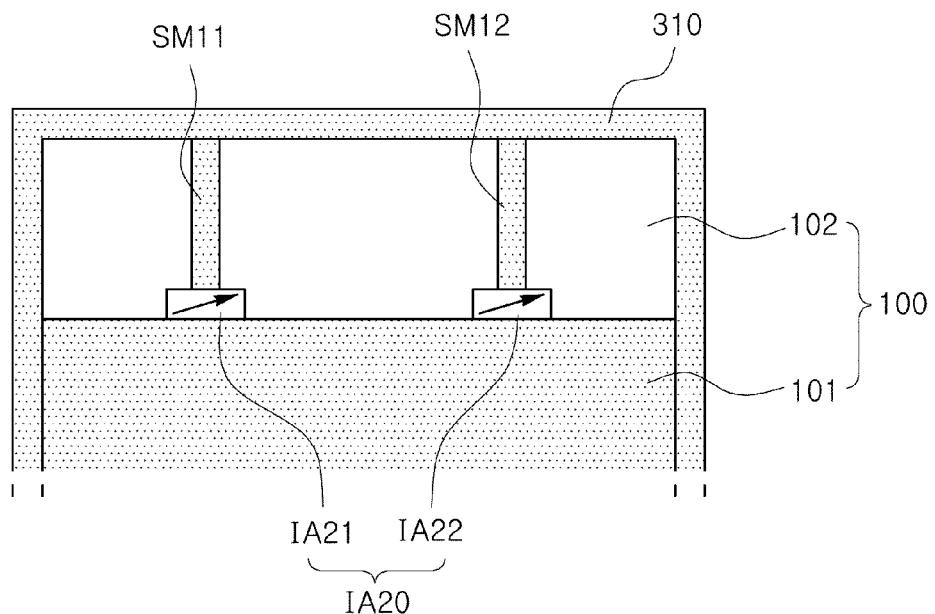

FIGS. 7A and 7B are views illustrating second impedance adjusting circuits according to an embodiment.

Referring to the example of FIGS. 7A and 7B, in the electronic device 10 according to the embodiment, a second impedance adjusting circuit IA20 is electrically connected to the first and second shields SM31 and SM32 in order to adjust resonance points of signal paths through the first and second shields SM31 and SM32.

As illustrated in FIG. 7A, the second impedance adjusting circuit IA20 includes impedance adjusting circuits IA21 and IA22 located between each of the first and second shields SM31 and SM32 and the first non-segmented conductor 310.

Referring to the example of FIG. 7B, the second impedance adjusting circuit IA20 includes impedance adjusting circuits IA21 and IA22 located between each of the first and second shields SM31 and SM32 and the ground of the board 100.

The second impedance adjusting circuit IA20 adjusts impedance in order to change a resonance frequency within the first communications band associated with the first antenna pattern ANT-P31, see FIG. 4.

As an example, the second impedance adjusting circuit IA20 is implemented as illustrated in the example of FIG. 12. In this example, impedance is varied depending on a control signal SC, see FIG. 12, and thus, a resonance frequency is varied according to the variations of the impedance.

Figure 8:
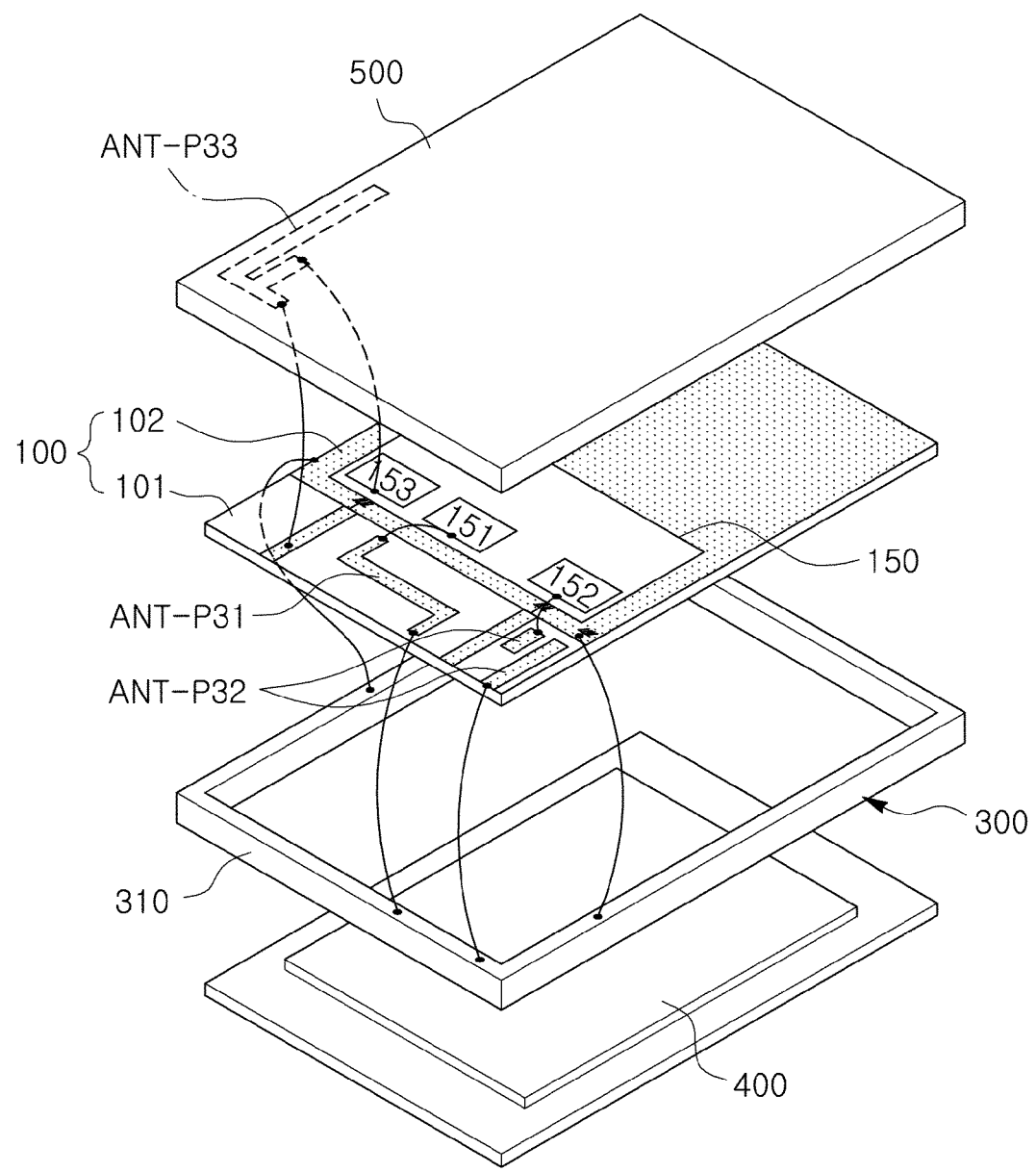
FIG. 8 is a view illustrating a first exploded structure of an electronic device according to an embodiment.

FIG. 8 is a view illustrating a first exploded structure of an electronic device according to an embodiment. FIG. 9 is a view illustrating a second exploded structure of an electronic device according to an embodiment.

Figure 9:
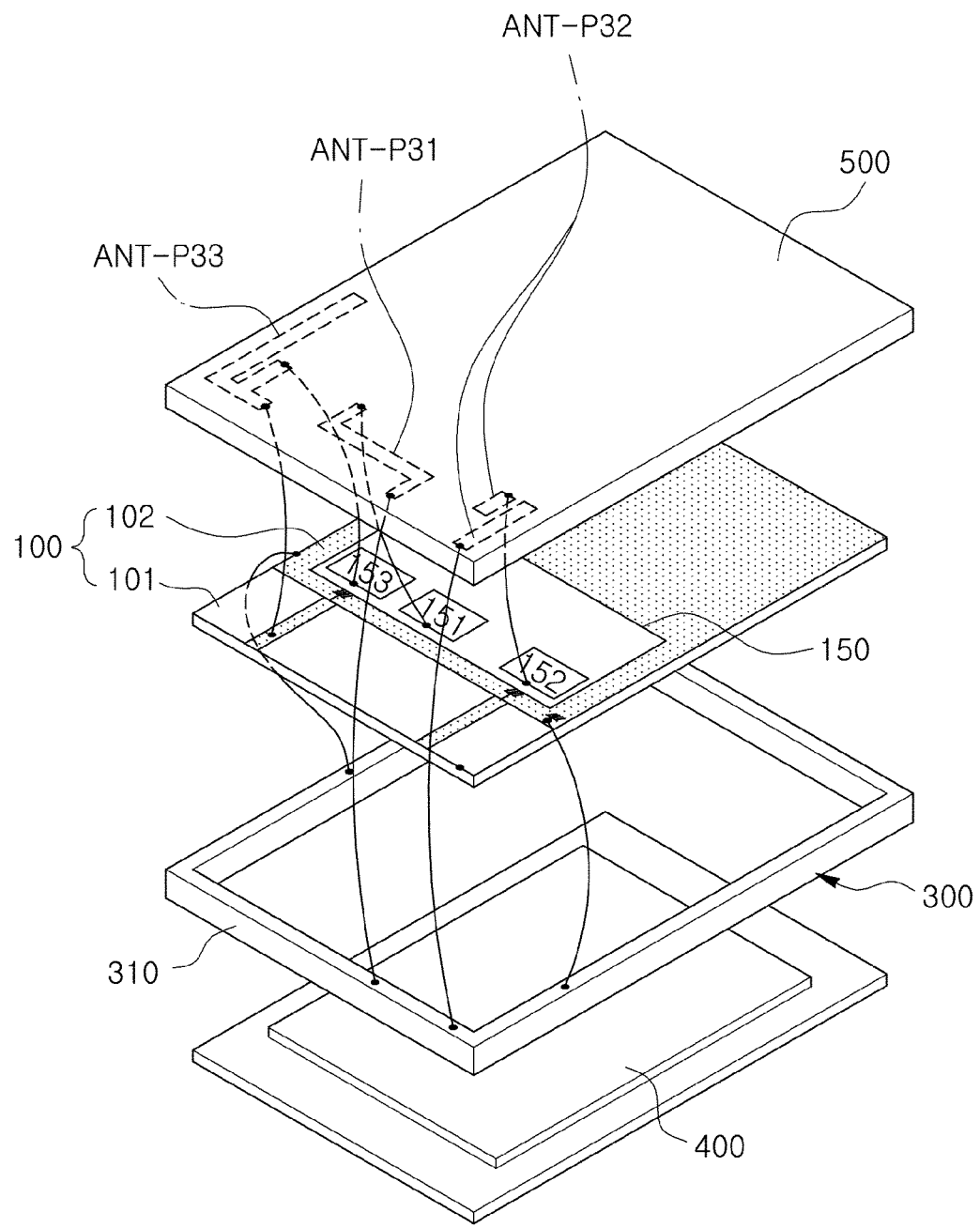
FIG. 9 is a view illustrating a second exploded structure of an electronic device according to an embodiment.

Referring to the examples of FIGS. 8 and 9, the first antenna pattern ANT-P31 is disposed on an internal surface of a cover of the electronic device.

As an alternative, the first antenna pattern ANT-P31 is optionally disposed in the non-conductive region 102 of the board.

Each of FIGS. 8 and 9 is only an example, and a position of the first antenna pattern ANT-P31 in the electronic device is not to be limited as long as the first antenna pattern ANT-P31 is electrically connected to the external conductor 300.

As illustrated in the example of FIG. 8, the second antenna pattern ANT-P32 is located in the non-conductive region 102 of the board.

As illustrated in the example of FIG. 9, the second antenna pattern ANT-P32 is disposed on the internal surface of the cover of the electronic device.

Each of FIGS. 8 and 9 is only an example, and a position of the second antenna pattern ANT-P32 in the electronic device is not to be limited as long as the second antenna pattern ANT-P32 is electrically connected to the external conductor 300.

As illustrated in the example of FIG. 8, the third antenna pattern ANT-P33 is optionally located in the non-conductive region 102 of the board.

As illustrated in the example of FIG. 9, the third antenna pattern ANT-P33 is optionally located on the internal surface of the cover of the electronic device.

Each of FIGS. 8 and 9 is only an example, and a position of the third antenna pattern ANT-P33 in the electronic device is not to be limited as long as the third antenna pattern ANT-P33 is electrically connected to the external conductor 300.

Figure 10:
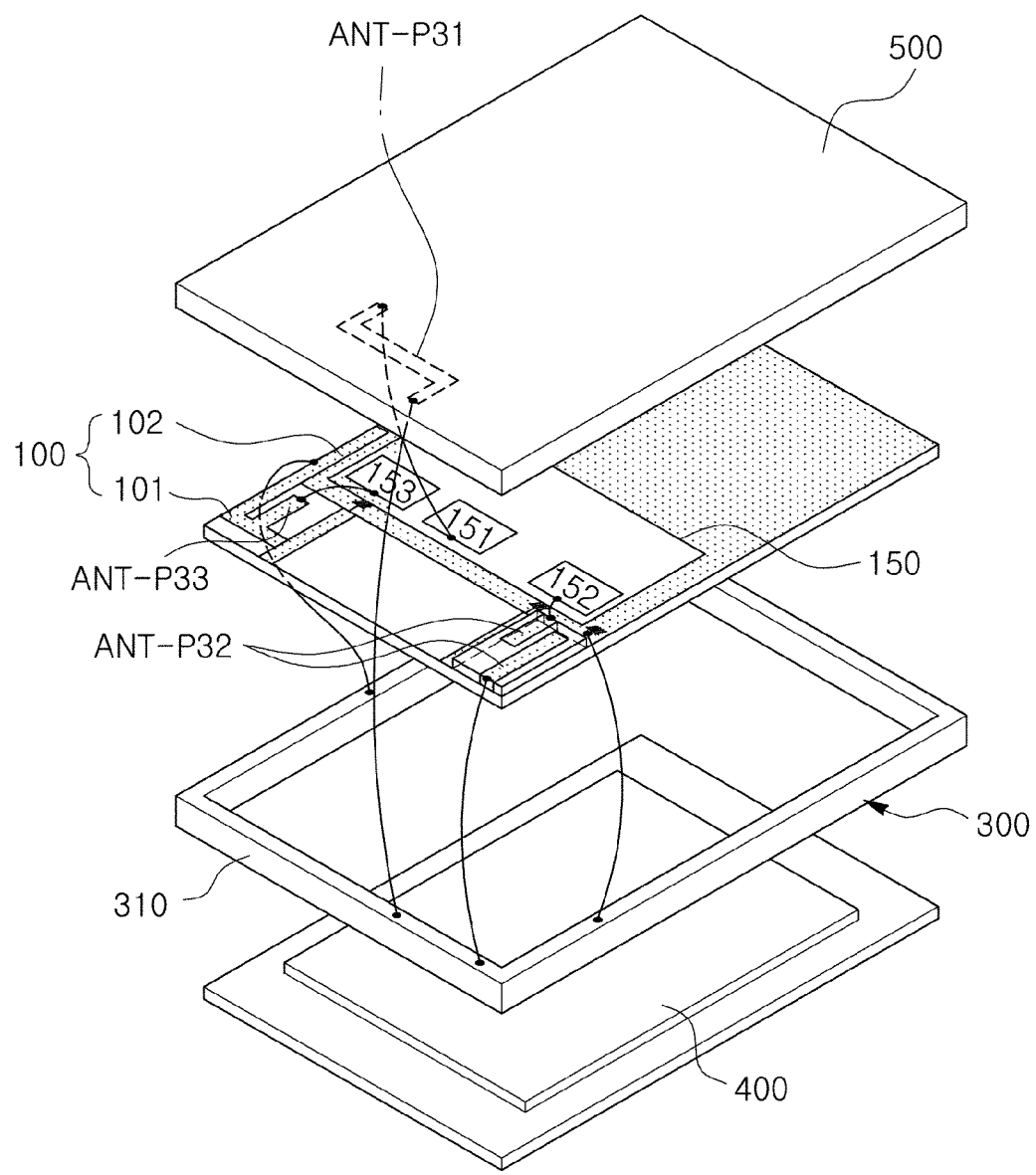
FIG. 10 is a view illustrating a third exploded structure of an electronic device according to another embodiment.

FIG. 10 is a view illustrating a third exploded structure of an electronic device according to another embodiment.

Referring to the example of FIG. 10, the first antenna pattern ANT-P31 is formed on a cover 500, the second antenna pattern ANT-P32 is formed in the non-conductive region 101 of the board 100, and the third antenna pattern ANT-P33 is formed on an antenna carrier ANT-C protruding from the board 100 toward the cover 500. In this example, the cover 500 possibly has a groove part formed therein so as to accommodate the third antenna pattern ANT-P33 and the corresponding antenna carrier ANT-C.

FIGS. 11A through 11E are cross-sectional views illustrating examples of assembled structures of an electronic device according to an embodiment.

Figure 11A:
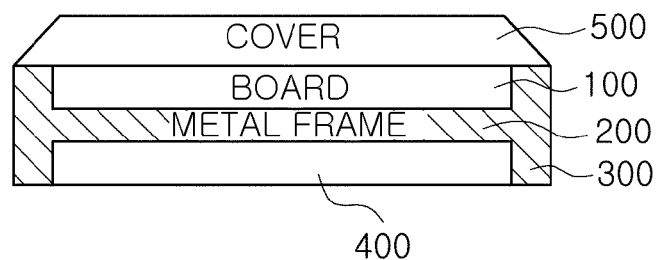
FIGS. 11A through 11E are cross-sectional views illustrating examples of assembled structures of an electronic device according to an embodiment.

FIG. 11A is a cross-sectional view illustrating an example of an assembled structure of an electronic device according to an embodiment. FIG. 11B through 11E are cross-sectional views illustrating modified examples of assembled structures of an electronic device according to an embodiment.

Referring to the examples of FIGS. 11A through 11E, in the electronic device, assembled and situated sequences of the cover 500, the board 100, the external conductor 300, and a display panel 400 are modified in various ways. Here, the cover 500 is formed of one of a conductive material and a non-conductive material.

In FIGS. 11A through 11E, a dark color denotes a conductive portion, and the external conductor 300 is formed integrally with the internal metal frame or is coupled to the internal metal frame in a state in which it is separated from the internal metal frame. In addition, the external conductor 300 is possibly formed integrally with the cover or is coupled to the cover in a state in which it is separated from the cover.

Figure 11B:
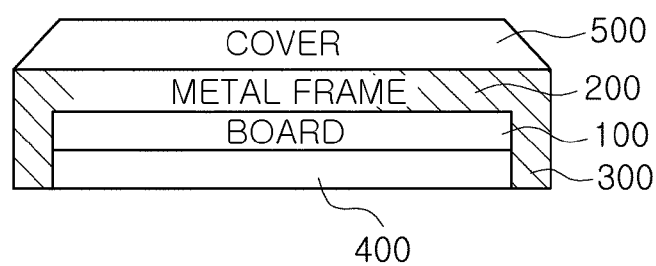

For example, as illustrated in the example of FIG. 11A, the external conductor 300 is formed integrally with a metal frame 200 located beneath the board 100. As illustrated in FIG. 11B, the external conductor 300 is formed integrally with a metal frame 200 disposed on the board 100.

Figure 11C:
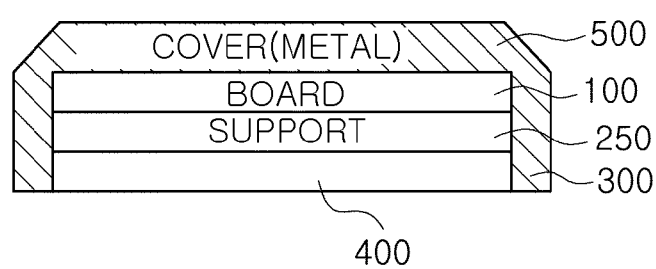

As illustrated in FIG. 11C, the external conductor 300 is formed integrally with the cover 500 being formed of a metal. As an example, a support 250 formed of a non-metal is located instead of the metal frame between the board 100 and the display panel 400.

Figure 11D:
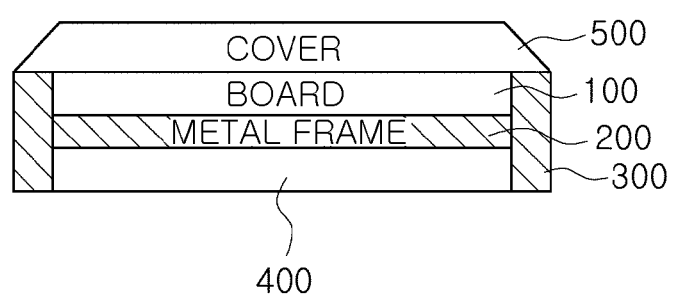
Figure 11E:
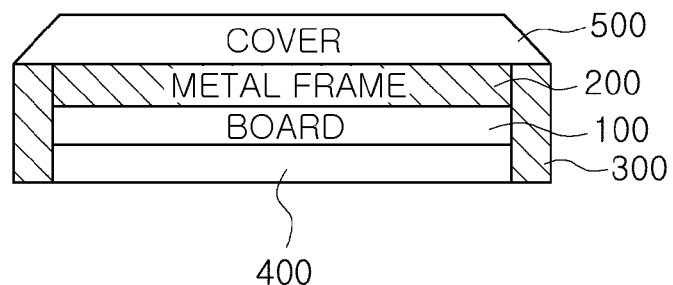

As illustrated in the example of FIG. 11D, the external conductor 300 is potentially manufactured separately from a metal frame 200 located beneath the board 100, and is assembled to be joined the metal frame 200. As illustrated in the example of FIG. 11E, the external conductor 300 is manufactured separately from a metal frame 200 located on the board 100, and is assembled to be joined to the metal frame 200.

As described above, the external conductor 300 is formed integrally with the metal frame located in the electronic device 10 in order to provide rigidity to the electronic device.

Here, the metal frame is formed to correspond to the conductive region 101 of the board 100. Alternatively, the metal frame is optionally formed to correspond to at least one non-conductive region in the conductive region 101 and also to the non-conductive region 102 of the board 100.

The external conductor 300, such as a conductor edge exposed to the outside of the electronic device 10, is formed of a conductive metal having persistence in a portion performing the antenna function, as described above.

On the other hand, the first impedance adjusting circuit IA10, see FIG. 6, adjusts impedance in order to change the resonance frequency within the first communications band, in association with the first antenna pattern ANT-P31, and the second impedance adjusting circuit IA20, see FIG. 7, adjusts impedance in order to change the resonance frequencies of the signal paths through the first and second shields SM31 and SM32, in association with the first and second shields.

The first impedance adjusting circuit IA10, see FIG. 6, and the second impedance adjusting circuit IA20, see FIG. 7, as described above, are potentially implemented as illustrated in FIG. 12, and the first impedance adjusting circuit IA10, see FIG. 6, is described with reference to FIG. 12.

FIG. 12 is a view illustrating a first impedance adjusting circuit according to an embodiment.

Referring to the example of FIG. 12, in the first impedance adjusting circuit IA10, switches SW1 and SW2 are adjusted to be in a switched-on state or a switched-off state depending on a control signal SC. Therefore, impedance is varied. As a result, the resonance frequency is varied.

The first impedance adjusting circuit illustrated in FIG. 12 is only an example of a variable circuit using the switches, and an impedance adjusting circuit of examples is not limited thereto.

For example, the first impedance adjusting circuit IA10 illustrated in FIG. 12 includes a fixing coupling element C11 and a switch impedance circuit connected to the fixing coupling element C11 in parallel. Here, the switch impedance circuit includes the switch SW1 and a capacitor C12 connected to each other in series, and/or the switch SW2 and an inductor L11 connected to each other in series.

In the first impedance adjusting circuit IA10 according to a first embodiment of FIG. 12, impedance is varied based on a capacitance of the fixing coupling element C11 and a capacitance of the capacitor C12 and an inductance of the inductor L11, depending on switching of the switches SW1 and SW2.

As described above, in an example in which the resonance frequency is changed within the first communications band by the first impedance adjusting circuit IA10, a communications band frequency may be varied in the first antenna pattern ANT-P31, the main antenna pattern. This variation of the communications band frequency has a negative influence on the second antenna pattern ANT-P32 and the third antenna pattern ANT-P33, which are the auxiliary antenna patterns, due to signal interference. However, in examples, the signal interference is shielded by the first shield SM31 and the second shield SM32.

Figure 13:
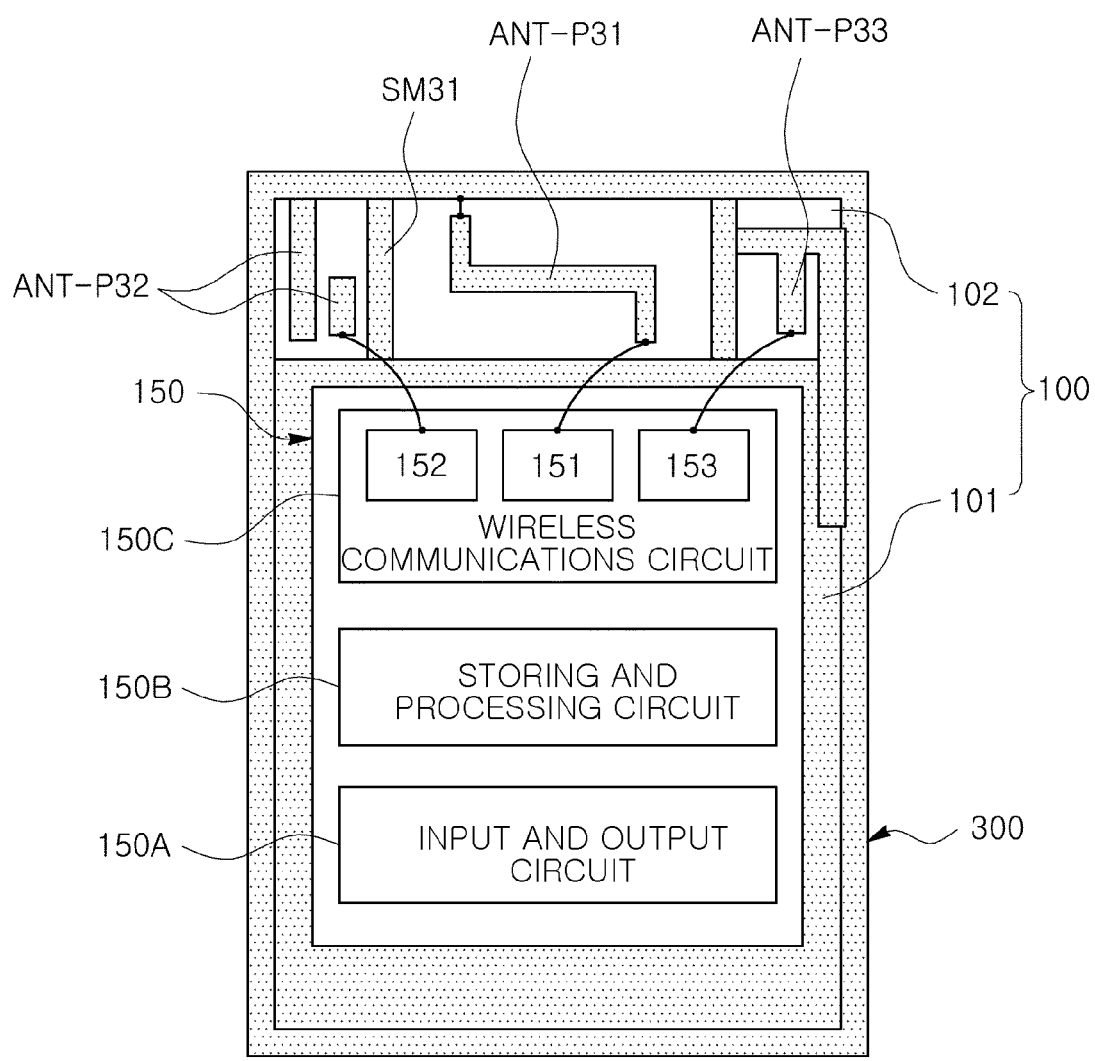
FIG. 13 is a view illustrating a configuration of a circuit part according to an embodiment.

FIG. 13 is a view illustrating a configuration of a circuit part according to an embodiment.

Referring to the example of FIG. 13, the electronic device 10 according to an embodiment is possibly a portable computer such as a portable tablet computer, a mobile phone, a mobile phone having a media player function, a handheld computer, a remote controller, a game player, a global positioning system (GPS) device, a combination of these devices, or any other appropriate portable electronic device.

As illustrated in the example of FIG. 13, the circuit part 150 of the electronic device 10 includes, for example, a central processing unit (CPU), an image signal processor (ISP), a memory, a communications modem, and input and output interfaces in order to support functions required in the electronic device 10. However, these are only examples, and other additional electronics are optionally present in addition to or instead of these elements. In addition, the ground of the circuit part 150 providing a reference potential in an operation may be electrically connected to a ground part GND of the board 100.

As an example, the circuit part 150 includes an input and output circuit 150A for inputting and outputting data, a storing and processing circuit 150B for storing and processing the data, and a wireless communications circuit 150C for performing near field communications or mobile phone communications.

Here, in the example of FIG. 13, the wireless communications circuit 150C includes the first communications circuit 151, the second communications circuit 152, and the third communications circuit 153 as described above, and performs wireless communications using the first antenna pattern ANT-P31, the second antenna pattern ANT-P32, and the third antenna pattern ANT-P33.

The input and output circuit 150A are used to input the data into the electronic device 10 or output the data into an external device of the electronic device 10.

As an example, the input and output circuit 150A include an input and output device such as a touch screen and another user input interface, and further include a user input and output device such as a button, a joystick, a click wheel, a scroll wheel, a touch pad, a keypad, a keyboard, a microphone, a camera, or the like. The user input device as described above optionally receives an externally-supplied command input in order to control an operation of the electronic device 10.

In addition, the input and output device optionally include a display and audio device such as a display or another component that provide visual information and state data.

As an example, the display and audio device further include audio devices such as a speaker and/or another device that generates sound.

In addition, the input and output device include an audio-video interface such as a jack and another connector for external headphones and a monitor.

For example, the storing and processing circuit 150B includes a storage such as a hard disk drive storage, a non-volatile memory, for example, a flash memory or a programmable read-only memory (ROM), a volatile memory, for example, a static or dynamic random access memory (RAM), or the like. However, these are only example storages and other storage devices are used in other examples. The storing and processing circuit 150B is used to control an operation of the electronic device 10.

For example, the storing and processing circuit 150B possibly includes at least one of a microprocessor, a microcontroller, a digital signal processor, and an application-specific integrated circuit (ASIC). In examples, the storing and processing circuit 150B is used to execute software such as an Internet browsing application, a voice-over-Internet-protocol (VoIP) phone call application, an e-mail application, a media playing application, an operating system function, and similar software, in the electronic device 10. In addition, the storing and processing circuit 150B is used at the time of implementing communications protocols in order to support interaction with external equipment. For example, the communications protocols that are implemented using the storing and processing circuit 150B include an Internet protocol, a wireless local area network (WLAN) protocol, for example, an IEEE 802.11 protocol, or Wi-Fi, another protocol for a short-distance wireless communications link such as a Bluetooth™ protocol, or the like, a mobile phone protocol, and other related appropriated communications protocols.

In addition, the wireless communications circuit 150C potentially includes one or more of integrated circuits, a power amplifier circuit, a low-noise input amplifier, a passive radio frequency (RF) component, and an RF transceiver circuit formed from another circuit for handling an RF signal, where these circuits are circuits that facilitate wireless communications.

In addition, the wireless communications circuit 150C includes a radio frequency transceiver circuit for managing signals within a plurality of radio frequency communications bands.

Examples of a mobile phone standard that is potentially supported by the electronic device 10 and the wireless communications circuit 150C include a global system for mobile communications (GSM) "2G" mobile phone standard, an evolution-data optimized (EVDO) mobile phone standard, a "3G" universal mobile telecommunications system (UMTS) mobile phone standard, a "3G" code division multiple access 2000 (CDMA 2000) mobile phone standard, and a 3GPP LTE mobile phone standard. Here, the mobile phone standard that is supported by the electronic device 10 and the wireless communications circuit 150C is not limited to these examples, but is possibly any wireless communications standard.

Particularly, the wireless communications circuit 150C uses the first antenna pattern ANT-P31, the second antenna pattern ANT-P32, and the third antenna pattern ANT-P33 in order to perform multi-band communications for supporting near field communications in the electronic device 10. The first antenna pattern ANT-P31, the second antenna pattern ANT-P32, and the third antenna pattern ANT-P33 perform antenna functions for preset corresponding communications bands in cooperation with the external conductor, respectively.

Figure 14A:
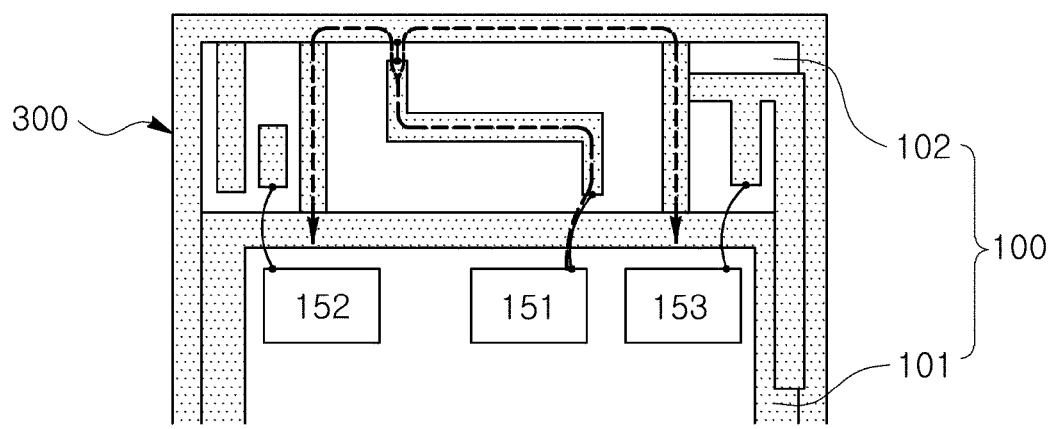
FIGS. 14A through 14C are views illustrating flows of feed signals through an external conductor and shielding members according to an embodiment.
Figure 14B:
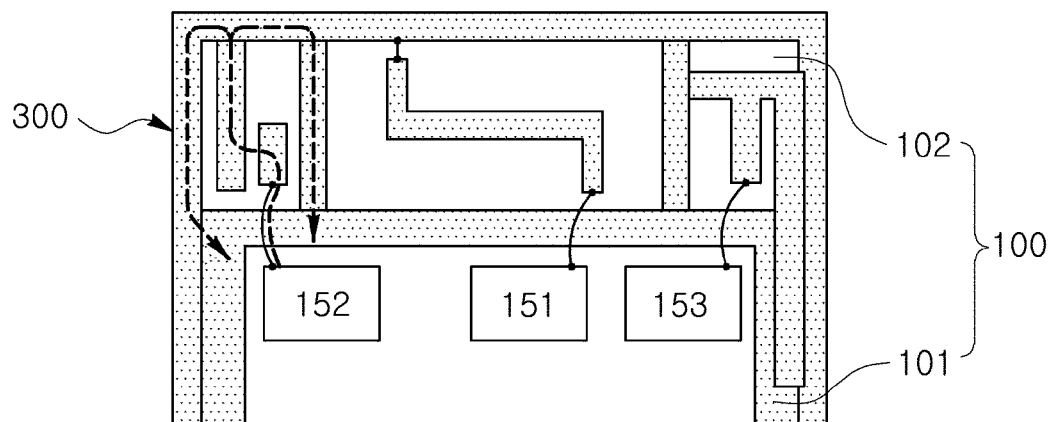
Figure 14C:
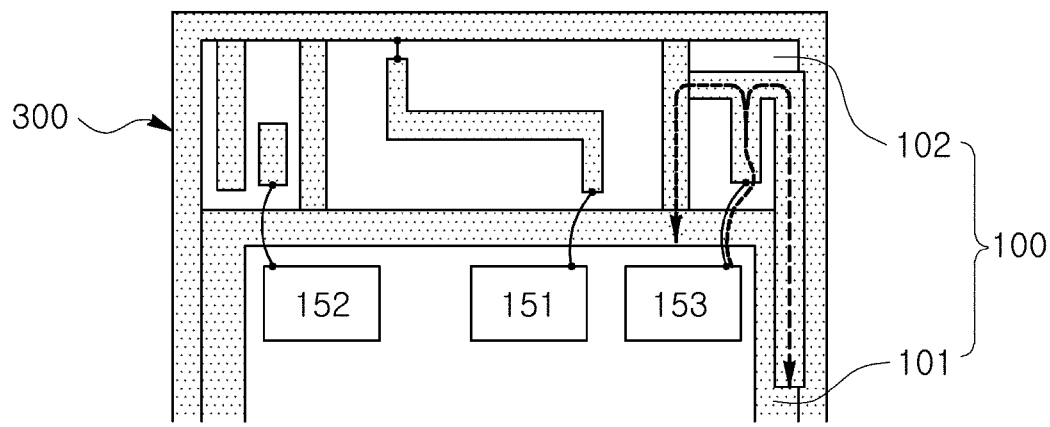

FIGS. 14A through 14C are views illustrating flows of feed signals through an external conductor and shields according to an embodiment.

FIG. 14A is a view illustrating a flow of the first feed signal through the first non-segmented conductor 310 and the first and second shields SM31 and SM32, according to an embodiment.

Referring to the example of FIG. 14A, when the first feed signal is provided by the first communications circuit 151 to the first antenna pattern ANT-P31, the first feed signal passes through the first antenna pattern ANT-P31 and then forms two signal paths.

Here, one signal path is a left signal path through which the first feed signal flows to the ground of the board 100 through the first non-segmented conductor 310 and the first shield SM31, and the other signal path is a right signal path through which the first feed signal flows to the ground of the board 100 through the first non-segmented conductor 310 and the second shield SM32.

As described above, the first shield SM31 and the second shield SM32 possibly not only provide the paths of the first feed signal for performing the antenna function, but also absorb interference signals between the first and second antenna patterns ANT-P31 and ANT-P32 and between the first and third antenna patterns ANT-P31 and ANT-P33, so as not to have a negative influence on resonance of the respective antenna patterns between the first and second antenna patterns ANT-P31 and ANT-P32 and between the first and third antenna patterns ANT-P31 and ANT-P33. Accordingly, the first shield SM31 and the second shield SM32, serve to shield the interference signals.

FIG. 14B is a view illustrating a flow of the second feed signal through the first non-segmented conductor 310 and the first shield SM31, according to an embodiment.

Referring to FIG. 14B, when the second feed signal is provided to the second antenna pattern ANT-P32 from the second communications circuit 152, the second feed signal passes through the second antenna pattern ANT-P32 and then forms two signal paths.

Here, one signal path is a left signal path through which the second feed signal flows into the ground of the board 100 through the first non-segmented conductor 310, and the other signal path is a right signal path through which the second feed signal flows into the ground of the board 100 through the first non-segmented conductor 310 and the first shield SM31.

As described above, the first shield SM31 potentially not only provides the paths of the second feed signal for performing the antenna function, but also absorbs an interference signal between the first and second antenna patterns ANT-P31 and ANT-P32 so as not to have a negative influence on resonance of the respective antenna patterns between the first and second antenna patterns ANT-P31 and ANT-P32. Accordingly, the first shield SM31 serves to shield the interference signal.

FIG. 14C is a view illustrating a flow of the third feed signal through the first non-segmented conductor 310 and the second shield SM32 according to an embodiment.

Referring to FIG. 14C, when the third feed signal is provided to the third antenna pattern ANT-P33 from the third communications circuit 153, the third feed signal passes through the third antenna pattern ANT-P33 and then forms two signal paths.

Here, one signal path is a left signal path through which the third feed signal flows into the ground of the board 100 through the second shield conductor SM32, and the other signal path is a path through which the third feed signal is radiated through the third antenna pattern ANT-P33.

As described above, the second shield SM32 not only provides the paths of the third feed signal for performing the antenna function, but also absorbs an interference signal between the first and third antenna patterns ANT-P31 and ANT-P33 so as not to have a negative influence on resonance of the respective antenna patterns between the first and third antenna patterns ANT-P31 and ANT-P33. Accordingly, the second shield SM32 serves to shield the interference signal.

As described above, in a case in which the first antenna pattern ANT-P31 operates as the main antenna pattern, even in an example of changing the resonance frequency within the first communications band by adjusting the first impedance adjusting circuit IA10 connected to the first antenna pattern ANT-P31, mutual interference is shielded for by the first shield SM31 and the second shield SM32. Therefore, resonance of the second and third antenna patterns ANT-P32 and ANT-P33 are constantly maintained without being affected by a change in the frequency from the first antenna pattern ANT-P31.

As set forth above, according to an embodiment, in the electronic device having the external conductor, multi-feed and a multi-band are covered using the non-segmented conductor having persistence in the external conductor and at least two antenna patterns, but an external conductor in which a segmentation is not present is used. Therefore, a metal-working process is more easily performed, such that a yield is improved, and the external conductor exposed to the outside is used, such that performance of the antenna is improved.

In addition, the shield is used between the antenna patterns to shield the signal interference between at least two antenna patterns. Therefore, the antenna is easily implemented, and the performance of the antenna is further improved.

The apparatuses, units, modules, devices, members, shields, conductors, and other components illustrated in FIGS. 1-14C that perform the operations described herein with respect to FIGS. 1-14C are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-14C. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14C that perform the operations described herein with respect to FIGS. 1-14C are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
   a board, comprising a peripheral portion, a conductive region comprising a ground, and a non-conductive region;
   an external conductor located in the peripheral portion and comprising a first non-segmented conductor connected to the ground and having persistence to perform as an antenna;
   a first antenna pattern configured to receive a first feed signal and connected to the first non-segmented conductor to contribute to a first resonance of a first communications band;
   a second antenna pattern configured to receive a second feed signal and connected to the first non-segmented conductor to contribute to a second resonance of a second communications band;
   a first shield located between the first antenna pattern and the second antenna pattern to shield signal interference therebetween and connected to each of the ground and the first non-segmented conductor, and
   a first impedance adjusting circuit located in a region between the first antenna pattern and the first non-segmented conductor and a region between the first antenna pattern and the ground,
   wherein the first impedance adjusting circuit adjusts impedance in order to change a resonance frequency within the first communications band associated with the first antenna pattern, and
   wherein the first impedance adjusting circuit comprises a fixing coupling element and a switch impedance circuit connected in parallel to the fixing coupling element.

2. The electronic device of claim 1, wherein the first shield provides paths for the first and second feed signals from the first non-segmented conductor to the ground.

3. The electronic device of claim 1, further comprising:
   a circuit part configured to provide the first and second feed signals,
   wherein the circuit part comprises
   a first communications circuit configured to provide the first feed signal to the first antenna pattern, and
   a second communications circuit configured to provide the second feed signal to the second antenna pattern.

4. The electronic device of claim 1, wherein the switch impedance circuit comprises a switch connected to a capacitor and a switch connected to an inductor.

5. The electronic device of claim 1, further comprising: a second impedance adjusting circuit located in a region between the first shield and the first non-segmented conductor and a region between the first shield and the ground, wherein the second impedance adjusting circuit adjusts impedance in order to change a resonance frequency within the first communications band associated with the first antenna pattern.

6. The electronic device of claim 1, wherein the first antenna pattern is disposed in the non-conductor region of the board and an internal surface of a cover of the electronic device.

7. The electronic device of claim 1, wherein the second antenna pattern is disposed in the non-conductor region of the board and an internal surface of a cover of the electronic device.

8. An electronic device, comprising:
   a board, comprising a peripheral portion, a conductive region comprising a ground, and a non-conductive region;
   an external conductor located in the peripheral portion and comprising a first non-segmented conductor connected to the ground and having persistence to perform as an antenna;
   a first antenna pattern configured to receive a first feed signal and connected to the first non-segmented conductor to contribute to a first resonance of a first communications band;
   a second antenna pattern configured to receive a second feed signal and connected to the first non-segmented conductor to contribute to a second resonance of a second communications band;
   a third antenna pattern configured to receive a third feed signal and connected to the first non-segmented conductor to contribute to a third resonance of a third communications band;

a first shield located between the first antenna pattern and the second antenna pattern to shield signal interference therebetween and connected to the ground and the first non-segmented conductor;

a second shield located between the first antenna pattern and the third antenna pattern to shield signal interference therebetween and connected to each of the ground and the first non-segmented conductor;

a first impedance adjusting circuit located in a region between the first antenna pattern and the first non-segmented conductor and a region between the first antenna pattern and the ground; and a second impedance adjusting circuit located in a region between the first and second shields and the first non-segmented conductor and a region between the first and second shields and the ground, wherein the second impedance adjusting circuit comprises a first impedance adjusting part located in a region between the first shield and the first non-segmented conductor and a region between the first shield and the ground, and a second impedance adjusting part located in at least one of a region between the second shield and the first non-segmented conductor and a region between the second shield and the ground, and the second impedance adjusting circuit adjusts impedance in order to change a resonance frequency within the first communications band associated with the first antenna pattern.

9. The electronic device of claim 8, wherein the first shield provides paths for the first and second feed signals from the first non-segmented conductor to the ground, and the second shield provides paths for the first and third feed signals from the first non-segmented conductor to the ground.

10. The electronic device of claim 8, further comprising:

a circuit part configured to provide the first to third feed signals, wherein the circuit part comprises a first communications circuit configured to provide the first feed signal to the first antenna pattern;

a second communications circuit configured to provide the second feed signal to the second antenna pattern; and a third communications circuit configured to provide the third feed signal to the third antenna pattern.

11. The electronic device of claim 8, wherein the first impedance adjusting circuit adjusts impedance to change a resonance frequency within the first communications band associated with the first antenna pattern.

12. The electronic device of claim 8, wherein the first antenna pattern is located in the non-conductor region of the board and an internal surface of a cover of the electronic device.

13. The electronic device of claim 8, wherein the second antenna pattern is located in the non-conductor region of the board and an internal surface of a cover of the electronic device.

14. The electronic device of claim 8, wherein the third antenna pattern is located in the non-conductor region of the board and an internal.

15. An electronic device, comprising:

a board, comprising a peripheral portion, a conductive region comprising a ground, and a non-conductive region;

an external conductor located in the peripheral portion and comprising a first non-segmented conductor connected to the ground and having persistence to perform as an antenna;

a first antenna pattern configured to receive a first feed signal and connected to the first non-segmented conductor to contribute to a first resonance of a first communications band;

a second antenna pattern configured to receive a second feed signal and connected to the first non-segmented conductor to contribute to a second resonance of a second communications band; and a first shield located between the first antenna pattern and the second antenna pattern to shield signal interference therebetween and connected to each of the ground and the first non-segmented conductor, wherein the first antenna pattern, the second antenna pattern and the first shield are all mounted on and in direct physical contact with the non-conductive region of the board, and wherein the non-conductive region of the board is located exclusively on a single surface of the board.

16. An electronic device, comprising:

a board, comprising a peripheral portion, a conductive region comprising a ground, and a non-conductive region;

an external conductor located in the peripheral portion and comprising a first non-segmented conductor connected to the ground and having persistence to perform as an antenna;

a first antenna pattern configured to receive a first feed signal and connected to the first non-segmented conductor to contribute to a first resonance of a first communications band;

a second antenna pattern configured to receive a second feed signal and connected to the first non-segmented conductor to contribute to a second resonance of a second communications band; and a first shield located between the first antenna pattern and the second antenna pattern to shield signal interference therebetween and connected to each of the ground and the first non-segmented conductor, wherein the first antenna pattern, the second antenna pattern, the third antenna pattern, the first shield and the second shield are all mounted on and in direct physical contact with the non-conductive region of the board, and wherein the non-conductive region of the board is positioned solely on a single surface of the board.

* * * * *